(12) United States Patent
Androulaki et al.

(10) Patent No.: US 10,936,552 B2
(45) Date of Patent: Mar. 2, 2021

(54) PERFORMING BILATERAL NEGOTIATIONS ON A BLOCKCHAIN

(71) Applicant: International Business Machines Corporation, Armonk, NY (US)

(72) Inventors: Elli Androulaki, Zürich (CH); Angelo De Caro, Zürich (CH); Matthias Neugschwandtner, Rueschlikon (CH); Alessandro Sorniotti, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 16/123,201

(22) Filed: Sep. 6, 2018

(65) Prior Publication Data

US 2020/0081998 A1    Mar. 12, 2020

(51) Int. Cl.
| | |
|---|---|
| *G06F 16/18* | (2019.01) |
| *H04L 9/06* | (2006.01) |
| *H04L 9/32* | (2006.01) |
| *H04L 9/08* | (2006.01) |
| *G06F 16/27* | (2019.01) |
| *G06F 16/182* | (2019.01) |

(52) U.S. Cl.
CPC ...... *G06F 16/1805* (2019.01); *G06F 16/1834* (2019.01); *G06F 16/27* (2019.01); *H04L 9/0643* (2013.01); *H04L 9/0819* (2013.01); *H04L 9/3228* (2013.01); *H04L 2209/38* (2013.01)

(58) Field of Classification Search
CPC .. G06F 16/1805; G06F 16/27; G06F 16/1834; G06F 16/178; H04L 9/0643; H04L 9/3228; H04L 9/0819; H04L 2209/38; H04L 9/3247; H04L 2209/56; H04L 9/3239
See application file for complete search history.

(56) References Cited

U.S. PATENT DOCUMENTS

| | | | |
|---|---|---|---|
| 9,300,639 B1* | 3/2016 | Roth | H04L 9/08 |
| 10,365,922 B1 | 7/2019 | Wang et al. | |
| 10,601,585 B1* | 3/2020 | Robinson | H04L 9/0894 |

(Continued)

FOREIGN PATENT DOCUMENTS

WO    2017091530 A1    6/2017

OTHER PUBLICATIONS

List of IBM Patents or Patent Applications Treated as Related, Sep. 14, 2018.

(Continued)

*Primary Examiner* — Michael R Vaughan

(57) ABSTRACT

An example operation may include one or more of determining a proposal associated with a first blockchain member and a second blockchain member is present in a pending notification stored on a blockchain, invoking a receiving function of a smart contract, receiving a private key from the second blockchain member to access the proposal stored in the blockchain, retrieving all pending notifications in the blockchain, and iterating decryption attempts, using the private key, over all blockchain transactions including the pending notifications to determine whether any of the pending notifications include the proposal for the second blockchain member.

20 Claims, 10 Drawing Sheets

(56) References Cited

U.S. PATENT DOCUMENTS

| | | | | |
|---|---|---|---|---|
| 2006/0080256 | A1* | 4/2006 | Karabulut | H04L 9/321 |
| | | | | 705/50 |
| 2016/0012364 | A1* | 1/2016 | Filgueiras | G06Q 50/01 |
| | | | | 705/7.13 |
| 2016/0260171 | A1 | 9/2016 | Ford et al. | |
| 2017/0103468 | A1 | 4/2017 | Orsini et al. | |
| 2018/0253702 | A1* | 9/2018 | Dowding | G06Q 20/06 |
| 2018/0331832 | A1* | 11/2018 | Pulsifer | H04L 9/0637 |
| 2018/0343114 | A1* | 11/2018 | Ben-Ari | G06F 21/64 |
| 2018/0365686 | A1 | 12/2018 | Kondo | |
| 2019/0149325 | A1* | 5/2019 | Garagiola | H04L 9/3263 |
| | | | | 380/278 |
| 2019/0156336 | A1* | 5/2019 | Kasthuri | H04L 9/3236 |
| 2019/0197532 | A1* | 6/2019 | Jayachandran | G06Q 20/3829 |
| 2019/0288853 | A1* | 9/2019 | Gray | H04L 9/3297 |
| 2019/0305938 | A1* | 10/2019 | Sandberg-Maitland | |
| | | | | H04L 9/321 |
| 2019/0322426 | A1 | 10/2019 | Verma et al. | |
| 2019/0325044 | A1* | 10/2019 | Gray | G06F 16/284 |
| 2019/0354693 | A1 | 11/2019 | Yoon et al. | |
| 2020/0014527 | A1 | 1/2020 | Subramaniam | |
| 2020/0082391 | A1* | 3/2020 | Androulaki | G06F 16/27 |
| 2020/0134206 | A1* | 4/2020 | Thekadath | H04L 9/3247 |
| 2020/0211011 | A1* | 7/2020 | Anderson | H04L 9/0643 |

OTHER PUBLICATIONS

Elli Androulaki, Performing Bilateral Negotiations on a Blockchain, U.S. Appl. No. 16/123,136, filed Sep. 6, 2018 (a copy is not provided as this application is available to the Examiner).
Richard Gendal Brown et al., Corda: An Introduction, ResearchGate, Refer to Sections 1, 2, 3.1, 4.1, 4.2 and 7. https://www.researchgate.net/publication/308636477_Corda_An_Introduction, Aug. 2016.

* cited by examiner

PERFORMING BILATERAL NEGOTIATIONS ON A BLOCKCHAIN

TECHNICAL FIELD

This application generally relates to bilateral negotiations, and more specifically to performing bilateral negotiations on a blockchain.

BACKGROUND

A ledger is commonly defined as an account book of final entry, in which transactions are recorded. Ledgers can be stored on paper or electronically on a computer. A distributed ledger is ledger that is replicated in whole or in part to multiple computers cryptographic distributed ledger (CDL): can have at least some of these properties: irreversibility—once a transaction is recorded, it cannot be reversed accessibility—any party can access the CDL in whole or in part chronological and time-stamped: all parties know when a transaction was added to the ledger consensus based: a transaction is added only if it is approved, typically unanimously, by parties on the network verifiability—all transactions can be cryptographically verified. A blockchain is an example of a CDL. While the description and figures below are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

At the heart of any blockchain is the transaction ledger to denote an ordered set of transactions that have been validated or confirmed within the blockchain system up to a certain point in time. For security purposes, the ledger is supposed to include only valid transactions and it should be impossible for any party to remove those transactions once they are committed (i.e., immutability). A distributed ledger is supported by peers in the network, for instance, by having the network peers decide which transactions should be validated by a consensus protocol. Such a ledger was developed to account for various types of transactions, which may be based on operations defined by smart contracts, where members may conduct transactions under certain conditions. For example, if a particular computation is performed by one party, then the peers can vote to determine validity of that computation and the corresponding transaction(s). The ledger, in such systems, is generally made public, and the transactions in it are publicly verifiable. That is, every user of the system should be able to obtain the ledger, and his/her transactions, verify that the list of transactions in the ledger are valid, and verify the correctness of the ledger itself.

SUMMARY

One example embodiment may provide a method that includes one or more of identifying a proposal associated with a first blockchain member and a second blockchain member, generating a key/value pair for the proposal, creating a writeset including the key/value pair, storing the writeset in a blockchain, receiving digital signatures at the blockchain from the first blockchain member and the second blockchain member, and validating the proposal as an agreement.

Another example embodiment may provide a system that includes a processor and memory, wherein the processor is configured to perform one or more of a first blockchain member device, a second blockchain member device, and a computing node configured to identify a proposal associated with the first blockchain member device and the second blockchain member device, generate a key/value pair for the proposal, create a writeset comprising the key/value pair, store the writeset in a blockchain, receive digital signatures at the blockchain from the first blockchain member device and the second blockchain member device, and validate the proposal as an agreement.

Still another example embodiment may include a non-transitory computer readable storage medium comprising instructions, that when read by a processor, cause the processor to perform one or more of identifying a proposal associated with a first blockchain member and a second blockchain member, generating a key/value pair for the proposal, creating a writeset comprising the key/value pair, storing the writeset in a blockchain, receiving digital signatures at the blockchain from the first blockchain member and the second blockchain member, and validating the proposal as an agreement.

Still yet another example embodiment may include a method that includes one or more of determining a proposal associated with a first blockchain member and a second blockchain member is present in a pending notification stored on a blockchain, invoking a receiving function of a smart contract, receiving a private key from the second blockchain member to access the proposal stored in the blockchain, retrieving all pending notifications in the blockchain, and iterating decryption attempts, using the private key, over all blockchain transactions comprising the pending notifications to determine whether any of the pending notifications include the proposal for the second blockchain member.

Still yet a further example embodiment includes a system that includes a processor and memory, wherein the processor is configured to perform one or more of a first blockchain member device, a second blockchain member device, and a computing node configured to determine a proposal associated with the first blockchain member device and the second blockchain member device is present in a pending notification stored on a blockchain, invoke a receive function of a smart contract, receive a private key from the second blockchain member device to access the proposal stored in the blockchain, retrieve all pending notifications in the blockchain, and iterate decryption attempts, using the private key, over all blockchain transactions comprising the pending notifications to determine whether any of the pending notifications include the proposal for the second blockchain member device.

Still yet a further example embodiment may include a non-transitory computer readable storage medium comprising instructions, that when read by a processor, cause the processor to perform one or more of determining a proposal associated with a first blockchain member and a second blockchain member is present in a pending notification stored on a blockchain, invoking a receiving function of a smart contract, receiving a private key from the second blockchain member to access the proposal stored in the blockchain, retrieving all pending notifications in the blockchain, and iterating decryption attempts, using the private key, over all blockchain transactions including the pending notifications to determine whether any of the pending notifications include the proposal for the second blockchain member.

DETAILED DESCRIPTION

Figure 1A:
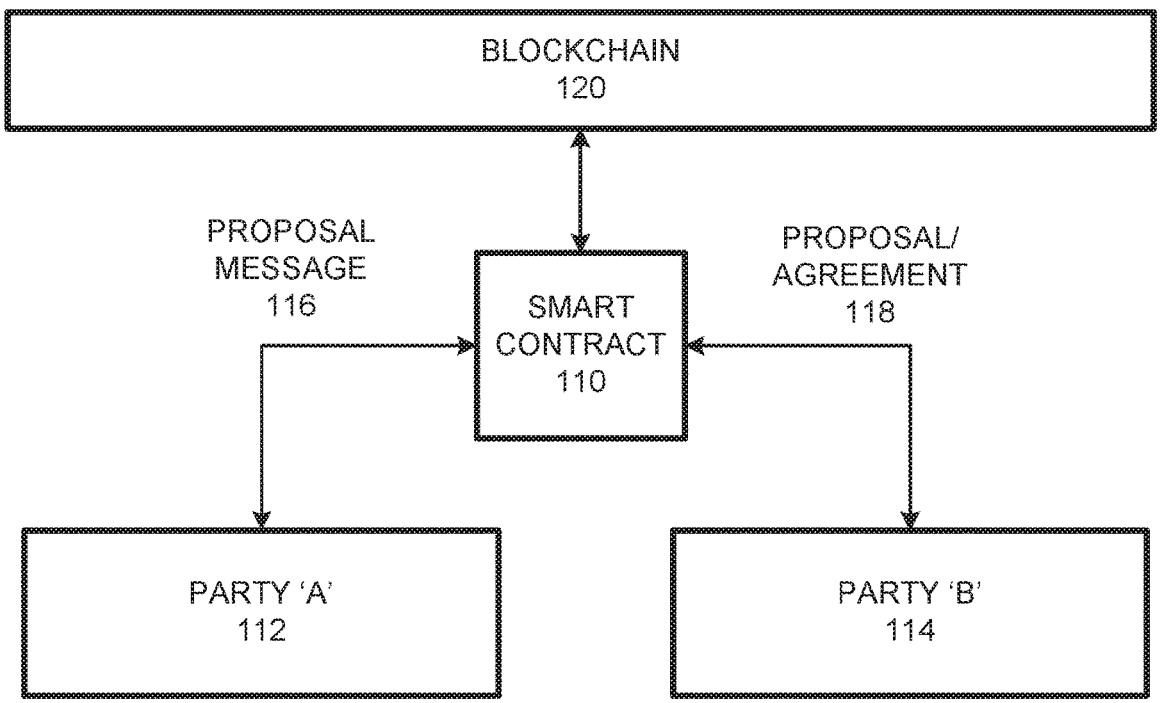
FIG. 1A illustrates a logic diagram of a bilateral agreement using a blockchain configuration, according to example embodiments.

It will be readily understood that the instant components, as generally described and illustrated in the figures herein, may be arranged and designed in a wide variety of different configurations. Thus, the detailed description of the embodiments of at least one of a method, an apparatus, a non-transitory computer readable medium and a system, as represented in the associated figures and description, is not intended to limit the scope of the application, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of messages or network data, such as, packet, frame, datagram, etc. Furthermore, while certain types of messages, signaling and protocols may be depicted in exemplary embodiments they are not limited to a certain type of message, signaling or protocol.

Example embodiments provide methods, devices, networks and/or systems, which support a blockchain method, device, computer readable medium, and system for performing bilateral negotiations over a shared ledger (blockchain) configuration. In a permissioned blockchain with 'n' participants, the number 'n' may be relatively high. In such a case, each participant can transact on the blockchain, and the 'n' participants may use the ledger to negotiate bilateral agreements. The negotiation history of all such members of the blockchain may be preserved for compliance reasons. Agreements may be required to remain confidential, and thus the identity of the negotiating parties should not be revealed. The content of the agreement also should be maintained in privacy. In such an agreement setting, two conflicting requirements might arise, such as all parties to the agreement may need to have a log of all exchanged messages, such that no party can deny sending a particular message (i.e., non-repudiation record). Another requirement may be that all messages need to remain confidential between two parties and it must not be obvious which two parties are communicating, except for the communicating parties themselves, otherwise the other members may easily identify a pair of members which are readily engaged in an agreement.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

In order to provide a working platform for bilateral negotiations, a blockchain may be used for the confidential and bilateral negotiation of agreements, which involves managing the back and forth sending and receiving of agreement proposals between the negotiating parties in lieu of their finalized agreement. Certain operations include ensuring the identities of the negotiating parties will not be revealed to outside parties, that the content of the agreement will be privately maintained, and that the integrity of the content of the agreement, authenticity of the negotiating parties, confidentiality, integrity, and data origin authentication, can be achieved using public key cryptography. The shared medium used to exchange encrypted/signed agreements is the ledger of a blockchain system. However, the confidentiality and privacy requirements may forbid any kind of selective endorsement of transactions. Since the parties involved in a negotiation are not going to be revealed, the blockchain must enforce proper agreement creation and reduce the chances of subsequent agreement tampering.

FIG. 1A illustrates a logic diagram of a bilateral agreement using a blockchain configuration, according to example embodiments. Referring to FIG. 1A, the configuration 100 includes a blockchain 120 which stores the smart contract 110, which is executed to manage a bilateral agreement. In operation, an agreement initiator, such as party 'A' 112 may submit a proposal message 116 intended for both party 'A' 112 and party 'B' 114 to the blockchain 120. The proposal may be stored in a pending notification that party 'B' 114 may access and sign to declare the proposal an agreement 118. In order to preserve anonymity, certain information must be identified by the parties to the agreement and confirmed via digital signatures.

In operation, it may be assumed that every participant in the blockchain is able to take part in every negotiation. In other words, the negotiations cannot be partitioned to ensure that only negotiations between members 'A' and 'B' can be in a specific space, because that would disclose to blockchain members that 'A' and 'B' are negotiating an agreement. As a result, it must be accepted that everyone can update the negotiations of the agreements. Certain concerns include identifying how a recipient knows that there is a new agreement proposal, and how can a malicious third party be excluded from polluting a negotiation between two legitimate parties. A first concern is addressed by a notification system, where 'A' generates the encrypted agreement proposal it wants to communicate to member 'B', assigns a universally unique identifier (UUID) to the agreement, and uses cryptography to communicate the UUID to user 'B' in a way that only user 'B' will be able to understand that the agreement proposal is for that user in addition to obtaining the UUID.

A second concern is addressed by using public key cryptography, which ensures that agreements can be signed and encrypted in ways that prevent attacks which could compromise confidentiality, integrity and authentication of agreements. In general, the UUID is a ledger-wise unique identifier that is not reproduced on the same ledger and thus remains unique each time such an ID is created. One approach to creating the UUID may be to sample a uniform random binary string of a sufficient length. Another approach may be attaching to the random string the public-keys of 'A' and 'B' and then using the UUID as the cryptographic hash of the concatenation of the random string and the public-keys assigned to 'A' and 'B'. In order to ensure the UUID is only written once and not recycled, the blockchain configuration may be setup to ensure this only occurs once via a smart contract code configuration. For example, once a transaction is ordered, that transaction needs to be validated by the blockchain network. The validation rule, which may be stored in the smart contract will enforce that the UUID is only written once to the ledger by rejecting all the transactions that are attempting to double-write/reuse the UUID value.

Figure 1B:
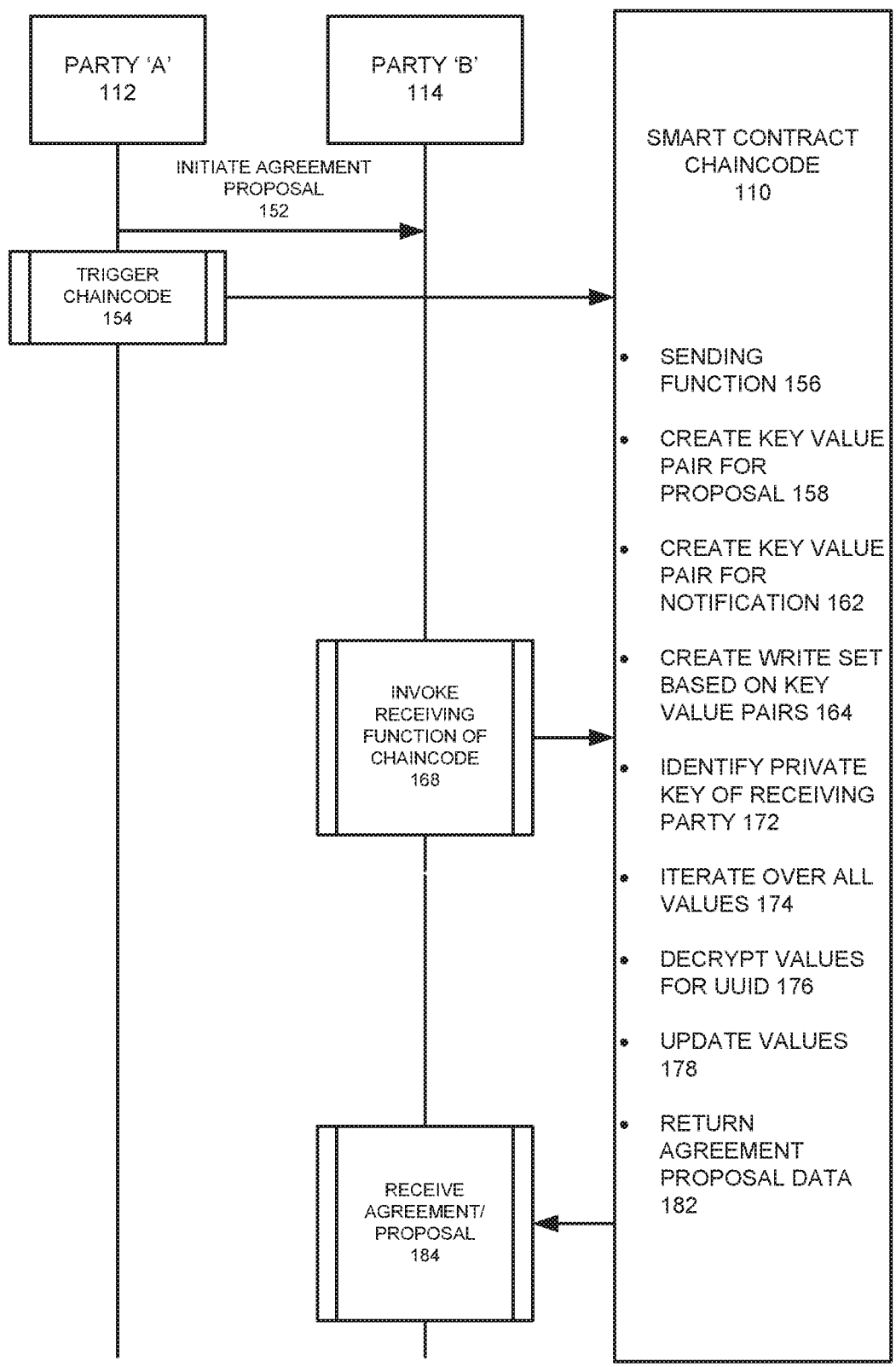
FIG. 1B illustrates a system diagram of a bilateral agreement using a blockchain configuration, according to example embodiments.

FIG. 1B illustrates a system diagram of a bilateral agreement using a blockchain configuration, according to example embodiments. Referring to FIG. 1B, the system configuration 150 includes the parties to a proposal including party 'A' 112 and party 'B' 114, both members of a particular blockchain 120. The example operation identifies a first party/user device 112 initiating a new agreement/proposal 152 intended for user device 114. As the new agreement is identified and received in the blockchain 120, certain chaincode will trigger 154 to enable the smart contract 110 to execute. For example, once the proposal is identified as being associated with a first blockchain member and a second blockchain member (i.e., parties A and B), a sending function 156 may send the proposal to the blockchain, and a key/value pair for the proposal may be created 158 to enable access for certain user devices. The notification for the proposal may be created along with another key/value pair 162. Also, a writeset comprising the key/value pair may be created 164 and stored in the blockchain 120. The party B 114 may receive a message that a notification is pending in the blockchain for review. Once the parties both agree by sending digital signatures to the blockchain, the proposal may be validated as an agreement.

A sending function may be invoked 168 as part of a smart contract to store the proposal in a notification as part of a blockchain transaction, a request to access the proposal may be identified from one or more of the intended parties and a proposal access function of the smart contract may also be enacted to initiate the access features. The proposal access function is invoked with a private key associated with the intended recipient party to the proposal, which is also a blockchain member. A designated computing node, server, virtual machine or other computing entity may be configured to receive the proposal and a private key associated with the party 'A' member at a computing node configured to execute the smart contract. The notification requires a different key/value pair used to transfer the proposal, and the writeset further includes the different key/value pair of the notification in the writeset in addition to the key/value pair of the proposal. The ratified agreement may include the key/value pair and the different key/value pair once the agreement is digitally signed by member keys of those intended parties. When creating the agreement, a universally unique identifier (UUID) that identifies the agreement may be created as a way to label and identify the agreement among various other information sources in the blockchain. The notification may be created to include the UUID and names of the parties/members as participants of the agreement.

During the receiving/accessing of the proposal, the computing node managing the proposal may receive a private key 172 from the intended recipient member's device, such as party 'B' 114 to access the proposal stored in the blockchain, all pending notifications in the blockchain may be identified and decryption attempts may be attempted and iterated 174 on all such pending notification transactions, using the private key of the recipient party 'B', to determine whether any of the pending notifications include the proposal for that blockchain member. Responsive to the iterating decryption attempts, all successfully decrypted blockchain transactions 176 are analyzed including the pending notification and the proposal. Responsive to identifying a successfully decrypted blockchain transaction comprising the pending notification and the proposal, a universally unique identifier (UUID) is identified that identifies the proposal and which is included in the decrypted blockchain transaction. The value of the UUID is compared to a UUID value stored in a key-value store to determine whether there is a match, and responsive to identifying the UUID and the UUID stored in the key-value store match, the proposal is identified as being intended for the second blockchain member. The values are updated 178 in the blockchain to indicate the proposal has been accessed, accepted and a valid agreement exists. The agreement is then returned 182, such as a text version being extracted and sent to the intended parties, which receive 184 the agreement for identification purposes.

In one example, cryptography may be used to bind the version number and the ID of a specific agreement proposal to that agreement, so that no agreement proposal can be accepted twice. Using a permissioned blockchain and setting up a single channel that all parties may use, the endorsement policy for the common channel requires one party to sign a transaction proposal. A bilateral negotiation may be conducted as an exchange of agreement proposals between two parties 'A' and 'B'. In this example, let's assume 'A' wants to send an agreement proposal 'M' to 'B'. Party A may produce a read/write set containing two key writes, such as a notification key/value and an agreement key/value. The notification example provides KEY: "NOTIFICATION"∥c1, VALUE: UUID, where c1=Enc(B, m1∥Sign(A, m1)), m1="A"∥"B". The lines∥denote a string concatenation. The value 'e1' is a cipher text encrypted by B's public key, and 'm1' is A's signature. The UUID identifies the agreement and 'm1' names the participants of the agreement.

In another notification example 'N2' replaces c1 with a cryptographic tag generated using a pseudorandom function (PRF) whose value A and B both know, and which is evaluated on a datum that is shared by A and B and is never reused (e.g., a counter). The PRF is a cryptographic primitive that is indistinguishable from a real random function. In this case, 'A' and 'B' share a secret seed and store a shared counter. The value 'c1' is then set as the output of the PRF evaluated on the seed and the counter, which can be used in the case where the public-key cryptography is not available. If the public-key cryptography is not available, then 'A' and 'B' need to agree, in an offline phase, on shared secrets that will be used to identify the agreements in which they are included. Because those secrets are shared by those two participants, they are only able to identify their agreements and not those of others.

In one example, the message may be as follows: KEY: UUID, VALUE: c2, where c2=Enc(B, m2 Sign(A, m2∥M)), m2=m1∥M∥UUID∥ver. In one example, 'ver' is the empty string, and the agreement is only accepted if key UUID has only been written to once (i.e., has never been overwritten). In another example, 'ver' is the version number of key UUID, and the agreement is accepted only if 'ver' from the 'm2' is equal to the number of times writing occurred to the key UUID. 'Enc' signifies encryption and 'Sign' signifies digital signature. For example, in order to consider an agreement valid, each participant needs to submit to the blockchain a signature to confirm the agreement. Then the version number 'ver' of the key, labelled with the value of the UUID, is counting the number of times that key has appeared on the ledger. The value 'ver' is used to determine how many times this key should appear before the agreement is considered valid by the blockchain network. Other examples may not require encrypting the UUID and 'ver' but instead bind the UUID and 'ver' to 'c2'. Such a binding may occur by using cryptographic binding and adding the UUID and ver to another signature and/or by using "additional authenticated data" to authenticate the UUID and ver as part of c2's decryption process. The value 'c2' contains the details of the agreement and the UUID is used to link the notification and the agreement.

One example method for sending an agreement proposal may provide a process of sending a message by using chaincode associated with a smart contract operation. Assuming A wants to send an agreement proposal to B, A may invoke a sending function of the chaincode with a cleartext proposal and a private key. The chaincode may generate a key/value pair for the proposal and another for the notification and produce a write set that includes the corresponding two key/value pairs. The notification may operate as an index configuration. 'B' can decrypt c1 to understand if that is the agreement that belongs to user 'B' without having to decrypt other information. If that agreement includes 'B' as one of the parties involved, then 'B' can decrypt the agreement to obtain the agreement information. The endorsed transactions contain a read/write set, which includes multiple key/value pairs. For notification data and agreement data, the information is the value portions of those key/value pairs. The smart contract may include a chaincode that exposes a function to send an agreement. This function uses as input the details of the agreement (e.g., a string) and A's secret key. The chaincode then generates the agreement proposal and the notification. The write-set and the key/value pairs are used in the chaincode context to specify the output generated by the chaincode.

In another example method for receiving an agreement, B may invoke the receiving function of the chaincode with a private key and the chaincode may iterate over all values in the notification namespace of the key value store (KVS), which provides that notification entries are read from the chaincode state and the chaincode represents a namespace in a given ledger. The KVS is essentially the chaincode's state represented as key-value pairs. In order for 'B' to accept the received request of agreements, 'B' invokes a specific function of the chaincode that takes as input B's private key. This function retrieves, from the ledger, iterated over values in the notification, all the notifications and checks which ones are for 'B' by decrypting those values. For each successfully decrypted value, with B's private key, a look-up of the UUID in the KVS is performed, the value for the UUID is decrypted with the private key, and a check of the version of the message may also be performed but remains an optional feature. A notification key has as corresponding value as a UUID. The UUID is also a key in the chaincode's state denoted as the KVS. The details of the agreement are contained in the value corresponding to the member whose value is UUID. Other operations performed for each decrypted value include updating the messages entry in the KVS with an arbitrary value to force a new version and mark it as "consumed", which is also an optional feature, and returns the plaintext of the agreement proposal. Once 'B' is notified that a new transaction has been added to the ledger, 'B' uses an assigned secret key to decrypt c1. If the decryption succeeds, then 'B' is aware that an agreement proposal for 'B' exists and can therefore process and share the agreement accordingly.

In another example of receiving an agreement, B may invoke the receiving function of the chaincode with his private key, the chaincode then performs a looks-up of the next expected entry based on the cryptographic tag (i.e., counter) for the notification, decrypts the agreement proposal UUID with B's private key, performs a look-up of the agreement proposal UUID in the KVS, checks the version of the agreement proposal, which is an optional operation, decrypts the value put under the UUID with B's private key and updates the entry of the agreement proposal in the KVS with an arbitrary value to initiate a new version and thus mark it "consumed", which is also an optional operation, and then returns the plaintext of the agreement proposal. The UUID corresponds to a value that represents a cipher text under B's public key. This cipher text is decrypted by the chaincode using B's private key. In accepting the agreement, 'B' overwrites the value corresponding to the UUID.

Figure 2A:
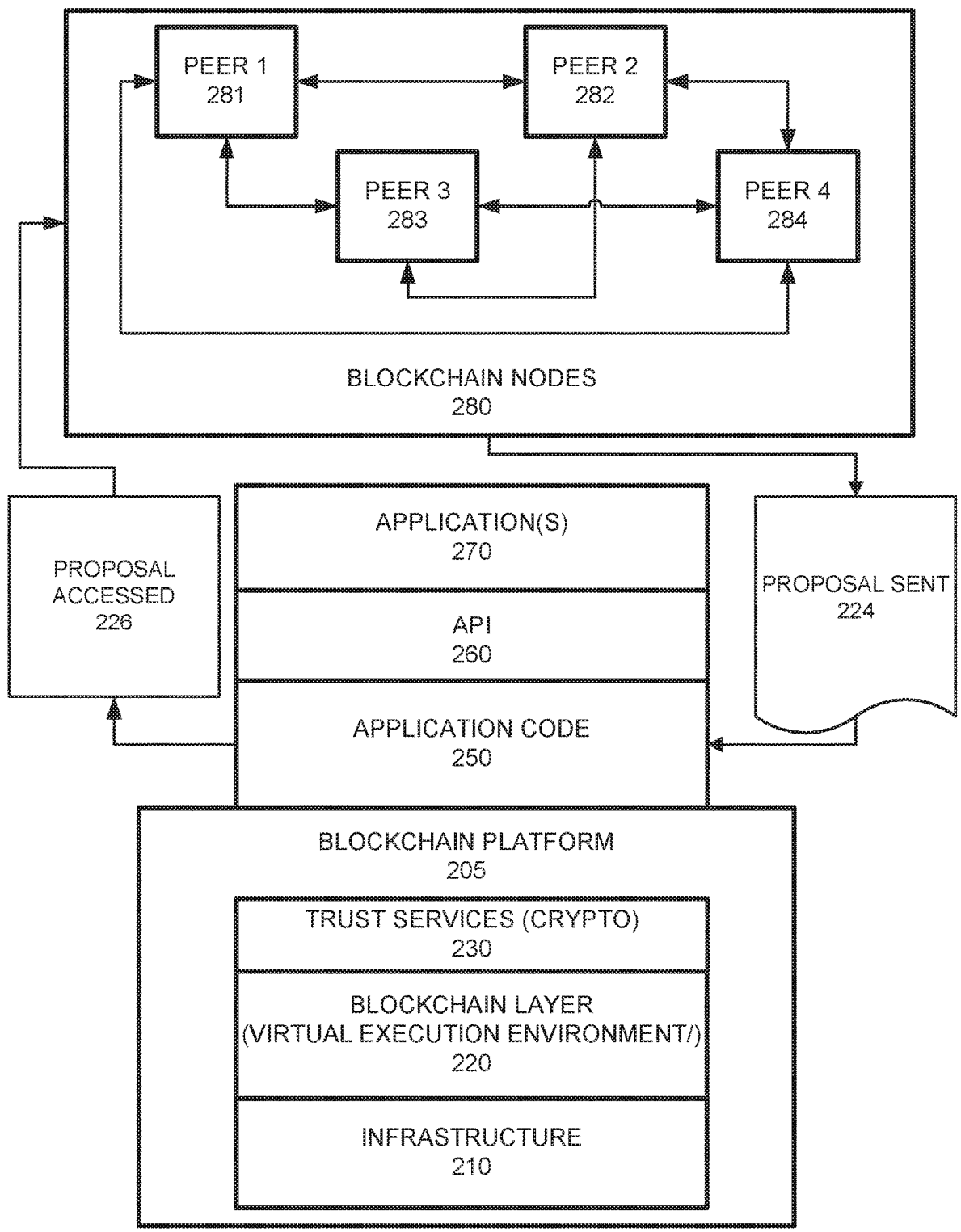
FIG. 2A illustrates an example blockchain architecture, according to example embodiments.

FIG. 2A illustrates a blockchain system architecture configuration 200A, according to example embodiments. Referring to FIG. 2A, blockchain architecture 200A may include certain blockchain elements, for example, a group 280 of blockchain nodes 281-284 which participate in blockchain transaction addition and validation process (consensus). One or more of the blockchain nodes 281-284 may endorse transactions and one or more blockchain nodes 281-284 may provide an ordering service for all blockchain nodes in the architecture 200A. A blockchain node may initiate a blockchain authentication and attempt to write to a blockchain immutable ledger stored in blockchain layer 220, a copy of which may also be stored on the underpinning physical infrastructure 210. The blockchain configuration may include one or more applications 270, which are linked to application programming interfaces (APIs) 260 to access and execute stored program/application code 250 (e.g., chaincode, smart contracts, etc.), which can be created according to a customized configuration sought by participants and can maintain their own state, control their own assets, and receive external information.

The blockchain base or platform 205 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain architecture configuration of FIG. 2A may process and execute program/application code 250 via one or more interfaces exposed, and services provided, by blockchain platform 205. The code 250 may control blockchain assets. For example, the code 250 can store and transfer data, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. In one example, when a proposal is sent 224 from one blockchain member and is intended for another blockchain member, the proposal is identified, stored in the blockchain and the application code 250 may cause certain access operations to occur so the proposal can be accessed 226 and accepted/rejected.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. In operation, the chaincode may receive a hash and retrieve from the blockchain a hash associated with the data template created by a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
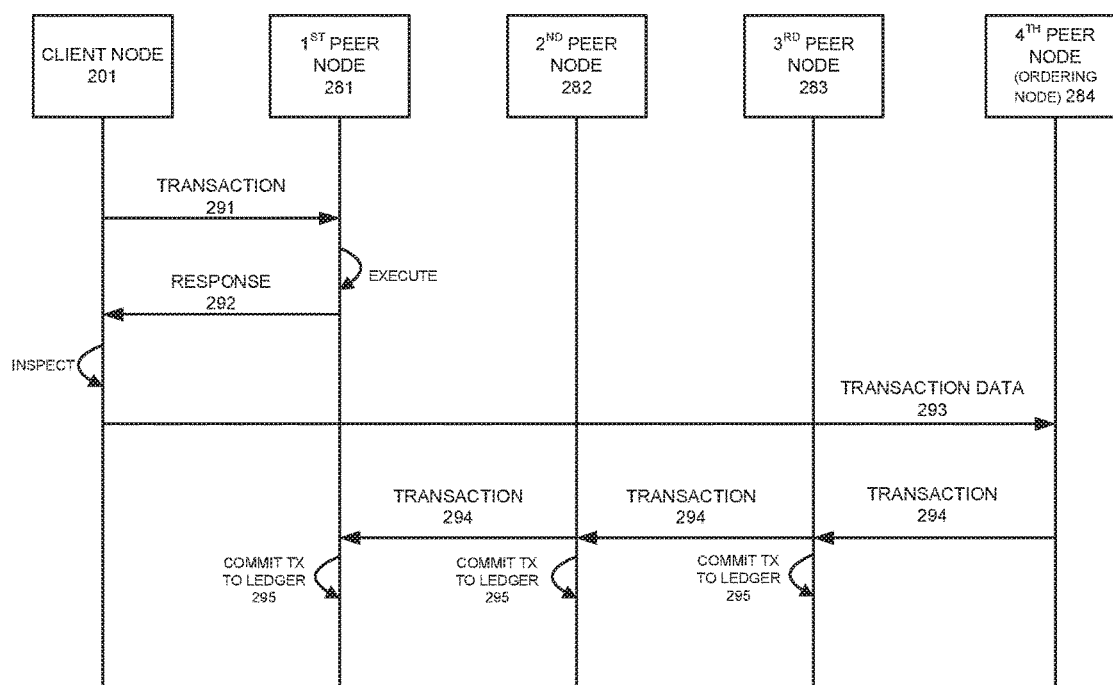
FIG. 2B illustrates an example peer node blockchain configuration, according to example embodiments.

FIG. 2B illustrates an example of a transactional flow 200B between nodes of the blockchain in accordance with an example embodiment. Referring to FIG. 2B, the transaction flow may include a transaction proposal 291 sent by an application client node 201 to an endorsing peer node 281. The endorsing peer 281 may verify the client signature, and execute a chaincode function to simulate the transaction. The output may include the chaincode results, a set of key/value versions that were read in the chaincode (read set), and the set of keys/values that were written in chaincode (write set). The proposal response 292 is sent back to the client 201 along with an endorsement signature, if approved. The client 201 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results, and authenticated the signatures against the transaction payload 293.

Referring again to FIG. 2B, the client node 201 initiates the transaction 291 by constructing and sending a request to the peer node 281, which is an endorser. The client 201 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 201 which parses the payload for the application to consume.

In response, the application of the client 201 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 201 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
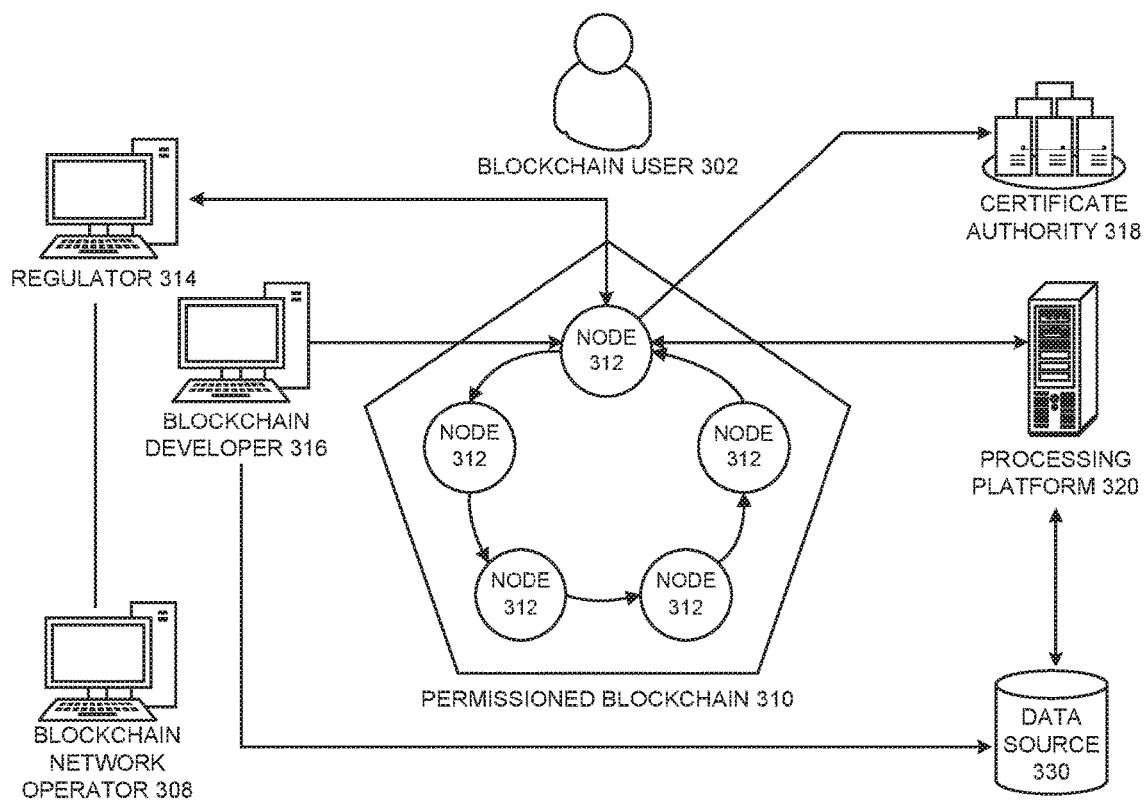
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted networks may provide access to regulator systems 314, such as auditors (the Securities and Exchange Commission in a U.S. equities market, for example). Meanwhile, a blockchain network operator node 308 manages member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
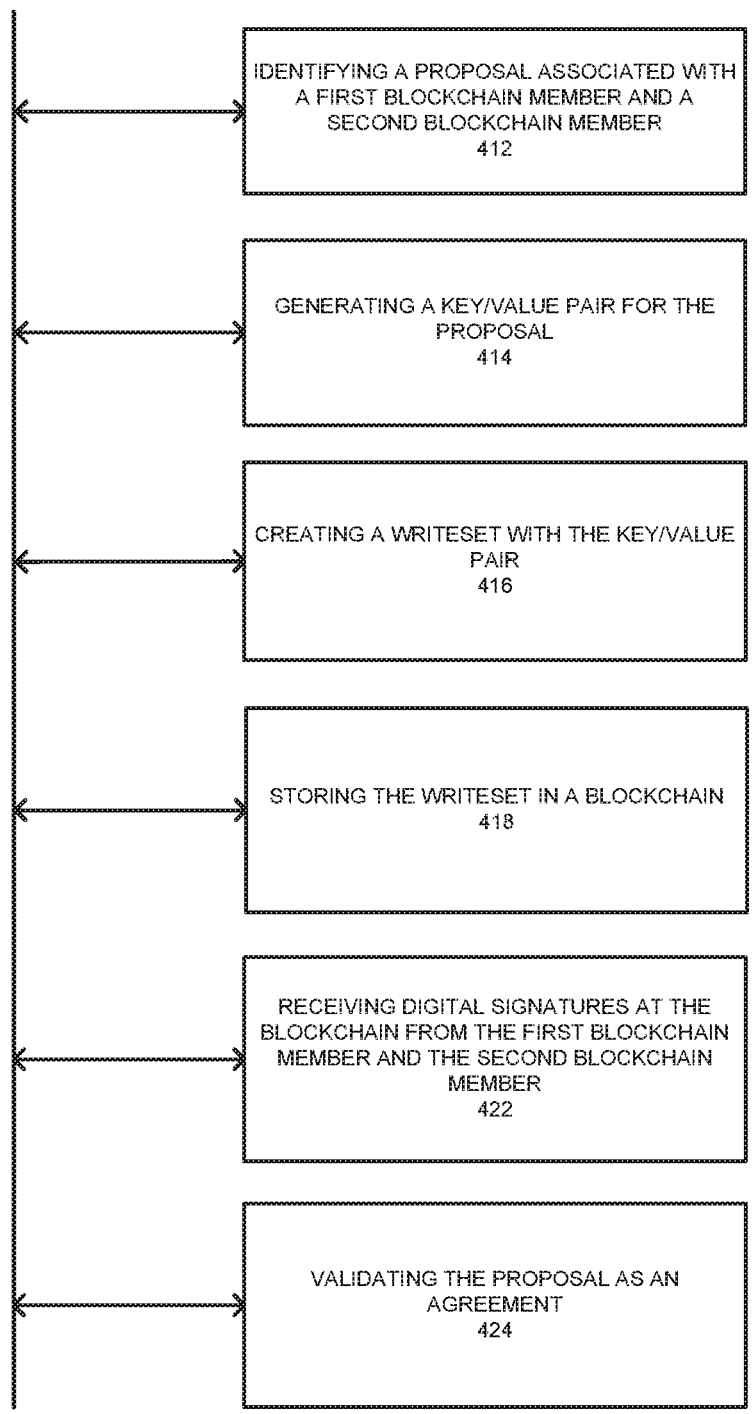
FIG. 4A illustrates a flow diagram of an example method of managing a bilateral agreement in a blockchain, according to example embodiments.

FIG. 4A illustrates a flow diagram of an example method of managing a bilateral agreement in a blockchain, according to example embodiments. Referring to FIG. 4A, the method 400 includes identifying a proposal associated with a first blockchain member and a second blockchain member 412, generating a key/value pair for the proposal 414, creating a writeset including the key/value pair 416, storing the writeset in a blockchain 418, receiving digital signatures at the blockchain from the first blockchain member and the second blockchain member 422, and validating the proposal as an agreement 424.

The method may also include invoking a sending function of a smart contract to store the proposal in a notification as part of a blockchain transaction, identifying a request to access the proposal, and invoking a proposal access function of the smart contract. The proposal access function is invoked with a private key associated with the second blockchain member. The method may also include receiving the proposal and a private key associated with the first blockchain member at a computing node configured to execute the smart contract, generating a different key/value pair for a notification used to transfer the proposal, and where the creating the writeset further includes having the different key/value pair in the writeset. The agreement includes the key/value pair and the different key/value pair. The method may also include generating a universally unique identifier (UUID) that identifies the agreement, and creating the notification to include the UUID and names of the first blockchain member and the second blockchain member as participants of the agreement.

Figure 4B:
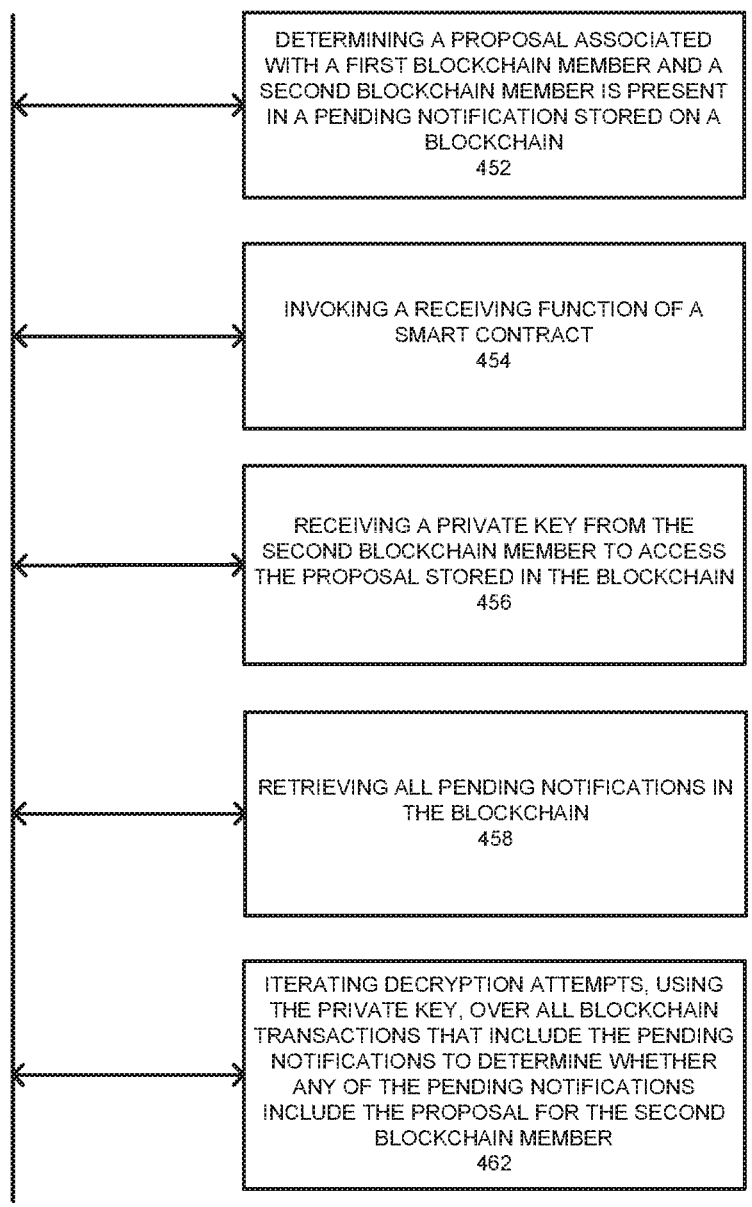
FIG. 4B illustrates a flow diagram of another example method of managing and accessing a bilateral agreement in a blockchain, according to example embodiments.

FIG. 4B illustrates a flow diagram of another example method of managing and accessing a bilateral agreement in a blockchain, according to example embodiments. The method 450 may include determining a proposal associated with a first blockchain member and a second blockchain member is present in a pending notification stored on a blockchain 452, invoking a receiving function of a smart contract 454, receiving a private key from the second blockchain member to access the proposal stored in the blockchain 456, retrieving all pending notifications in the blockchain 458, and iterating decryption attempts, using the private key, over all blockchain transactions comprising the pending notifications to determine whether any of the pending notifications include the proposal for the second blockchain member 462.

The method may also include, responsive to the iterating decryption attempts, identifying a successfully decrypted blockchain transaction comprising the pending notification and the proposal. The receiving function is invoked via the second blockchain member, and the second blockchain member is an intended recipient of the proposal and the first blockchain member is an initiator of the proposal. Responsive to identifying a successfully decrypted blockchain transaction comprising the pending notification and the proposal, the method provides identifying a universally unique identifier (UUID) that identifies the proposal and which is included in the decrypted blockchain transaction. The method may also include comparing the UUID to a UUID stored in a key-value store to determine whether there is a match, and responsive to identifying the UUID and the UUID stored in the key-value store match, confirming that the proposal is intended for the second blockchain member. The method may also include responsive to determining the pending notifications include the proposal for the second blockchain member, providing a plain text version of the proposal to the second blockchain member.

Figure 5A:
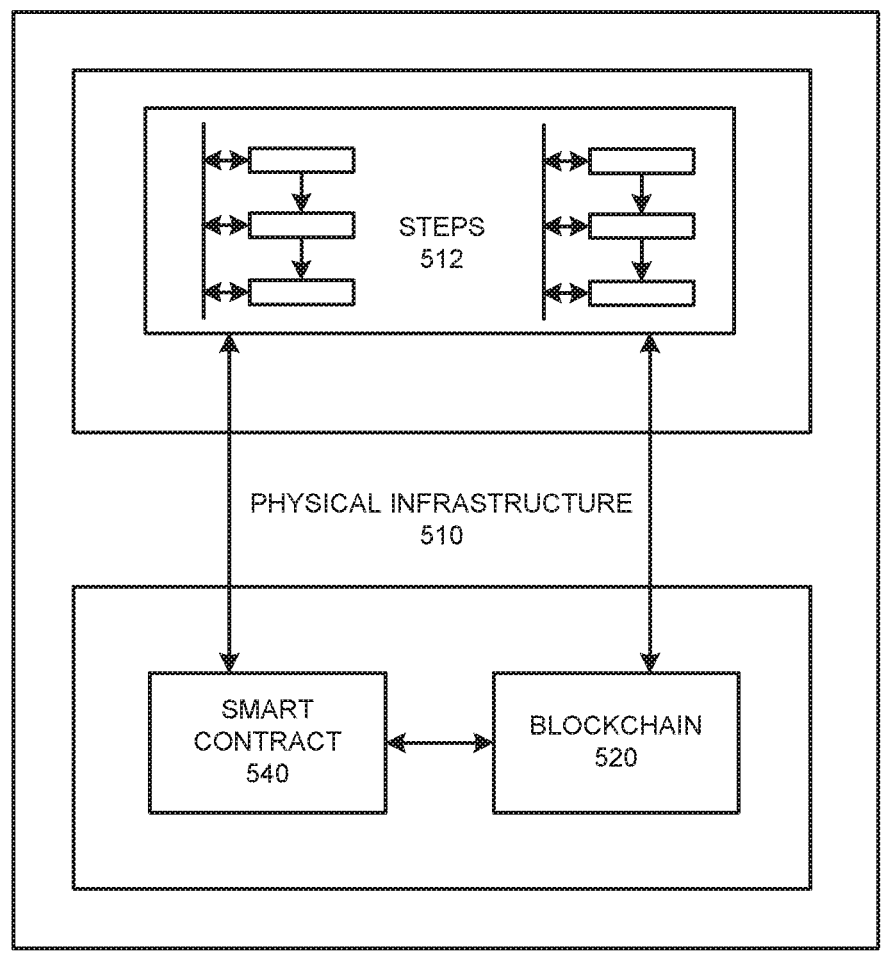
FIG. 5A illustrates an example physical infrastructure configured to perform various operations on the blockchain in accordance with one or more operations described herein, according to example embodiments.

FIG. 5A illustrates an example physical infrastructure configured to perform various operations on the blockchain in accordance with one or more of the example methods of operation according to example embodiments. Referring to FIG. 5A, the example configuration 500A includes a physical infrastructure 510 with a blockchain 520 and a smart contract 540, which may execute any of the operational steps 512 included in any of the example embodiments. The steps/operations 512 may include one or more of the steps described or depicted in one or more flow diagrams and/or logic diagrams. The steps may represent output or written information that is written or read from one or more smart contracts 540 and/or blockchains 520 that reside on the physical infrastructure 510 of a computer system configuration. The data can be output from an executed smart contract 540 and/or blockchain 520. The physical infrastructure 510 may include one or more computers, servers, processors, memories, and/or wireless communication devices.

Figure 5B:
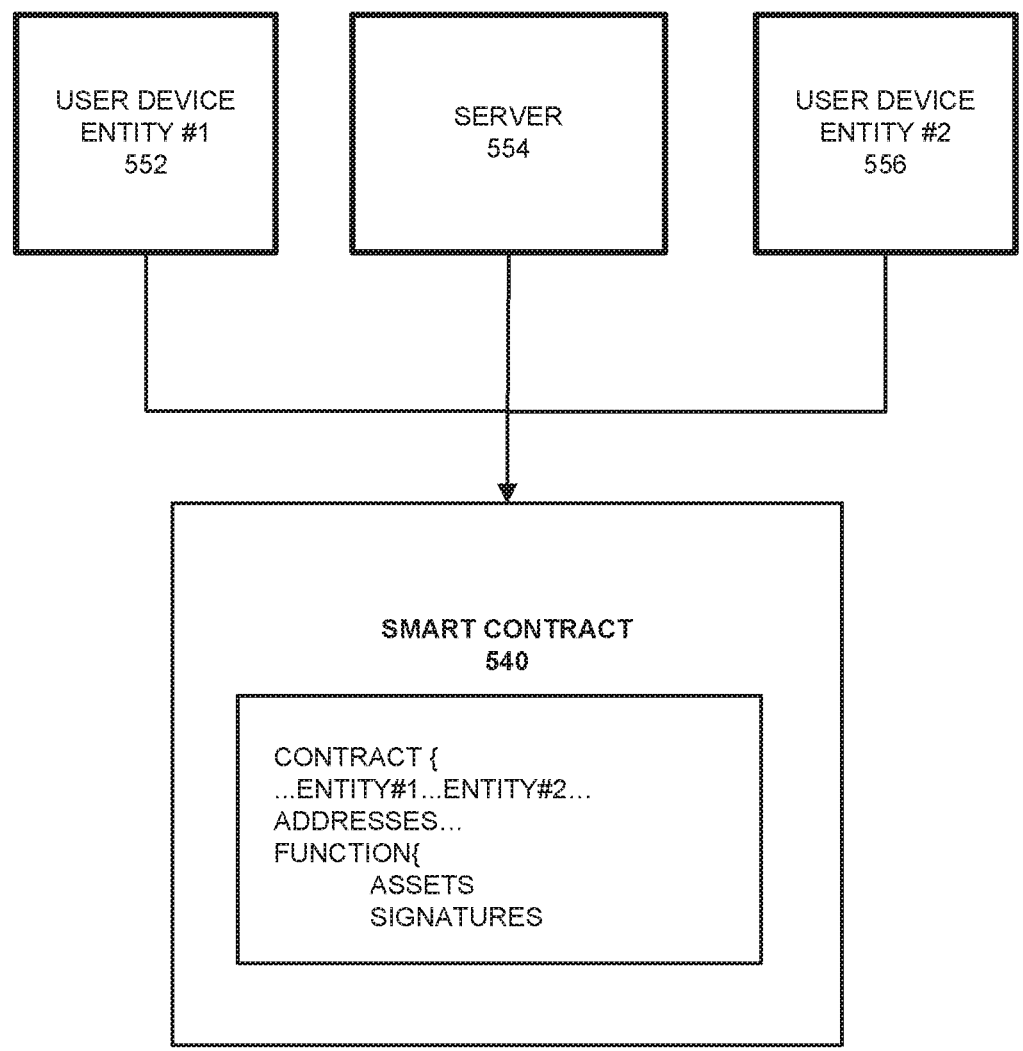
FIG. 5B illustrates an example smart contract configuration among contracting parties and a mediating server configured to enforce smart contract terms on a blockchain, according to example embodiments.

FIG. 5B illustrates an example smart contract configuration among contracting parties and a mediating server configured to enforce the smart contract terms on the blockchain according to example embodiments. Referring to FIG. 5B, the configuration 500B may represent a communication session, an asset transfer session or a process or procedure that is driven by a smart contract 540 which explicitly identifies one or more user devices 552 and/or 556. The execution, operations and results of the smart contract execution may be managed by a server 554. Content of the smart contract 540 may require digital signatures by one or more of the entities 552 and 556 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
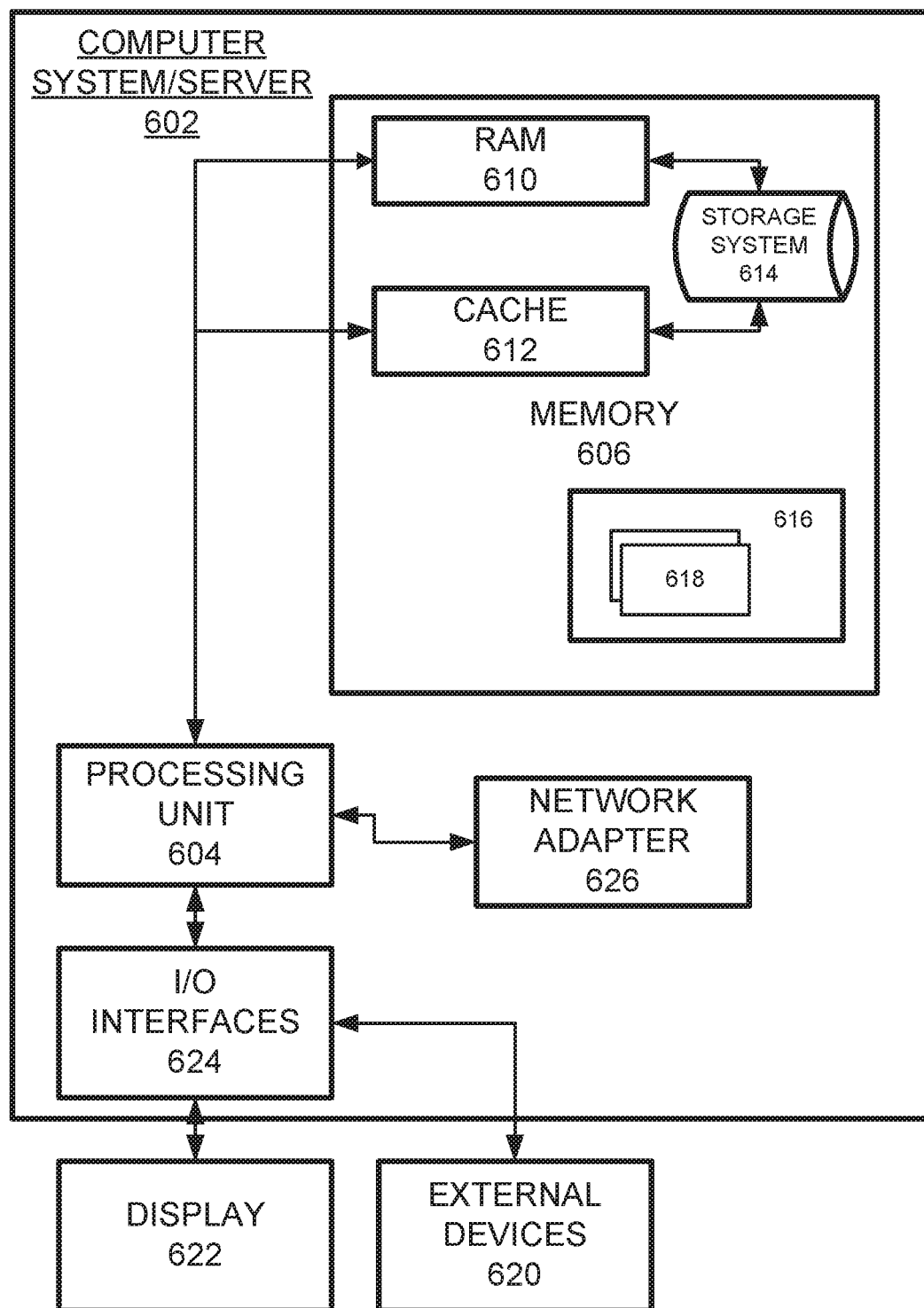
FIG. 6 illustrates an example computer system configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving a private key of a second blockchain member and a request to access a proposal stored in a blockchain which is between a first blockchain member and the second blockchain member;
   identifying pending notifications in the blockchain; and
   attempting to identify a pending notification associated with the proposal, the attempting comprising attempting to decrypt, using the private key, blockchain transactions comprising the pending notifications.

2. The method of claim 1, further comprising:
   responsive to successfully decrypting a blockchain transaction, identifying a pending notification included in the successfully decrypted blockchain transaction as being associated with the proposal and transmitting information about the pending notification to the second blockchain member.

3. The method of claim 1, further comprising invoking a receiving function of a smart contract to invoke the attempting.

4. The method of claim 1, wherein the second blockchain member is an intended recipient of the proposal and the first blockchain member is an initiator of the proposal.

5. The method of claim 1, further comprising:
   responsive to successfully decrypting a blockchain transaction comprising a pending notification, identifying a universally unique identifier (UUID) included in the pending notification that identifies the proposal.

6. The method of claim 5, further comprising:
   comparing the UUID to a UUID stored in a key-value store to determine whether there is a match; and
   responsive to identifying the UUID and the UUID stored in the key-value store match, confirming the proposal is intended for the second blockchain member.

7. The method of claim 1, further comprising:
   responsive to successfully decrypting a blockchain transaction comprising a pending notification of the proposal, providing a plain text version of the proposal to the second blockchain member.

8. A system, comprising:
   a processor configured to
      receive a private key of a second blockchain member device and a request to access a proposal stored in a blockchain which is between a first blockchain member device and the second blockchain member device;
      identify pending notifications in the blockchain; and
      attempt to identify a pending notification associated with the proposal with attempts to decrypt, using the private key, blockchain transactions comprising the pending notifications.

9. The system of claim 8, wherein the processor is further configured to identify a pending notification in a successfully decrypted blockchain transaction as being associated with the proposal, and transmit information about the pending notification to the second blockchain member.

10. The system of claim 8, wherein the processor is configured to invoke a receive function of a smart contract to invoke the attempt to identify the pending notification.

11. The system of claim 8, wherein the second blockchain member device is an intended recipient of the proposal and the first blockchain member device is an initiator of the proposal.

12. The system of claim 1, wherein responsive to identification of a successfully decrypted blockchain transaction that comprises a pending notification associated with the proposal, the processor is further configured to identify a universally unique identifier (UUID) included in the pending notification that identifies the proposal.

13. The system of claim 12, wherein the processor is further configured to compare the UUID to a UUID stored in a key-value store to determine whether there is a match; and
responsive to the UUID and the UUID stored in the key-value store being a match, confirm the proposal is intended for the second blockchain member device.

14. The system of claim 8, wherein the processor is further configured to provide a plain text version of the proposal to the second blockchain member responsive to successfully decrypting a blockchain transaction comprising a pending notification of the proposal.

15. A non-transitory computer readable storage medium configured to store instructions that when executed cause a processor to perform a method comprising:
receiving a private key of a second blockchain member and a request to access a proposal stored in a blockchain which is between a first blockchain member and the second blockchain member;
identifying pending notifications in the blockchain; and
attempting to identify a pending notification associated with the proposal, the attempting comprising attempting to decrypt, using the private key, blockchain transactions comprising the pending notifications.

16. The non-transitory computer readable storage medium of claim 15, wherein the method further comprises:
responsive to successfully decrypting a blockchain transaction, identifying a pending notification included in the successfully decrypted blockchain transaction as being associated with the proposal and transmitting information about the pending notification to the second blockchain member.

17. The non-transitory computer readable storage medium of claim 15, wherein the method further comprises invoking a receiving function of a smart contract to invoke the attempting.

18. The non-transitory computer readable storage medium of claim 15, wherein the second blockchain member is an intended recipient of the proposal and the first blockchain member is an initiator of the proposal.

19. The non-transitory computer readable storage medium of claim 16, wherein the method further comprises:
responsive to identifying a successfully decrypted blockchain transaction comprising a pending notification associated with the proposal, identifying a universally unique identifier (UUID) that identifies the proposal and which is included in the pending transaction;
comparing the UUID to a UUID stored in a key-value store to determine whether there is a match; and
responsive to identifying the UUID and the UUID stored in the key-value store match, confirming the proposal is intended for the second blockchain member.

20. The non-transitory computer readable storage medium of claim 15, wherein the method further comprises:
responsive to successfully decrypting a blockchain transaction comprising a pending notification of the proposal, providing a plain text version of the proposal to the second blockchain member.

* * * * *